May 3, 1960 D. S. COLLINS 2,935,087
THERMOELECTRICALLY POWERED AUTOMATIC DIAPHRAGM VALVE
Original Filed Sept. 5, 1951 3 Sheets-Sheet 1
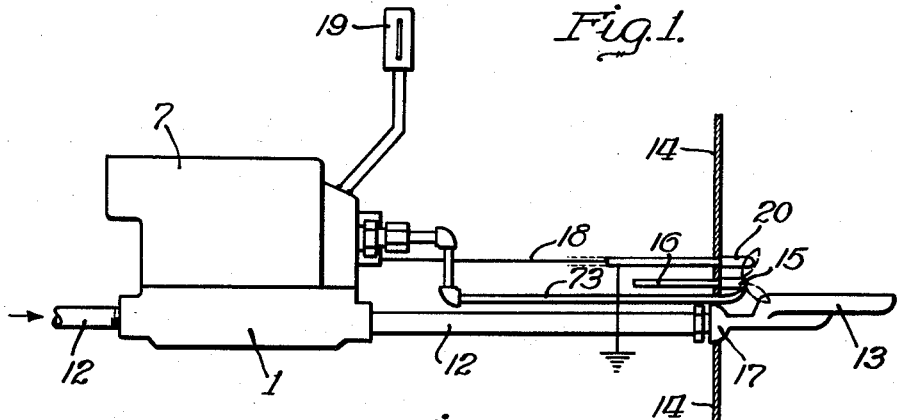
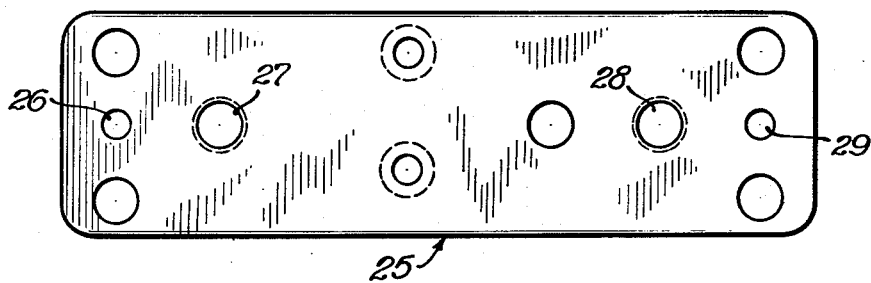
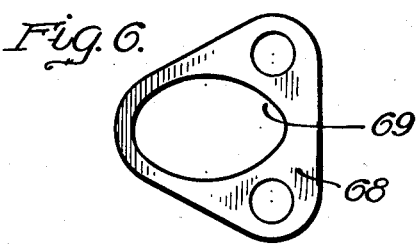 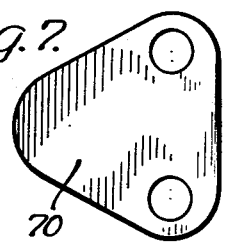
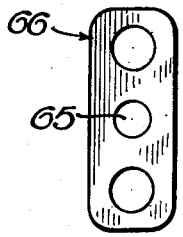
INVENTOR.
Donley S. Collins
BY
Attys.

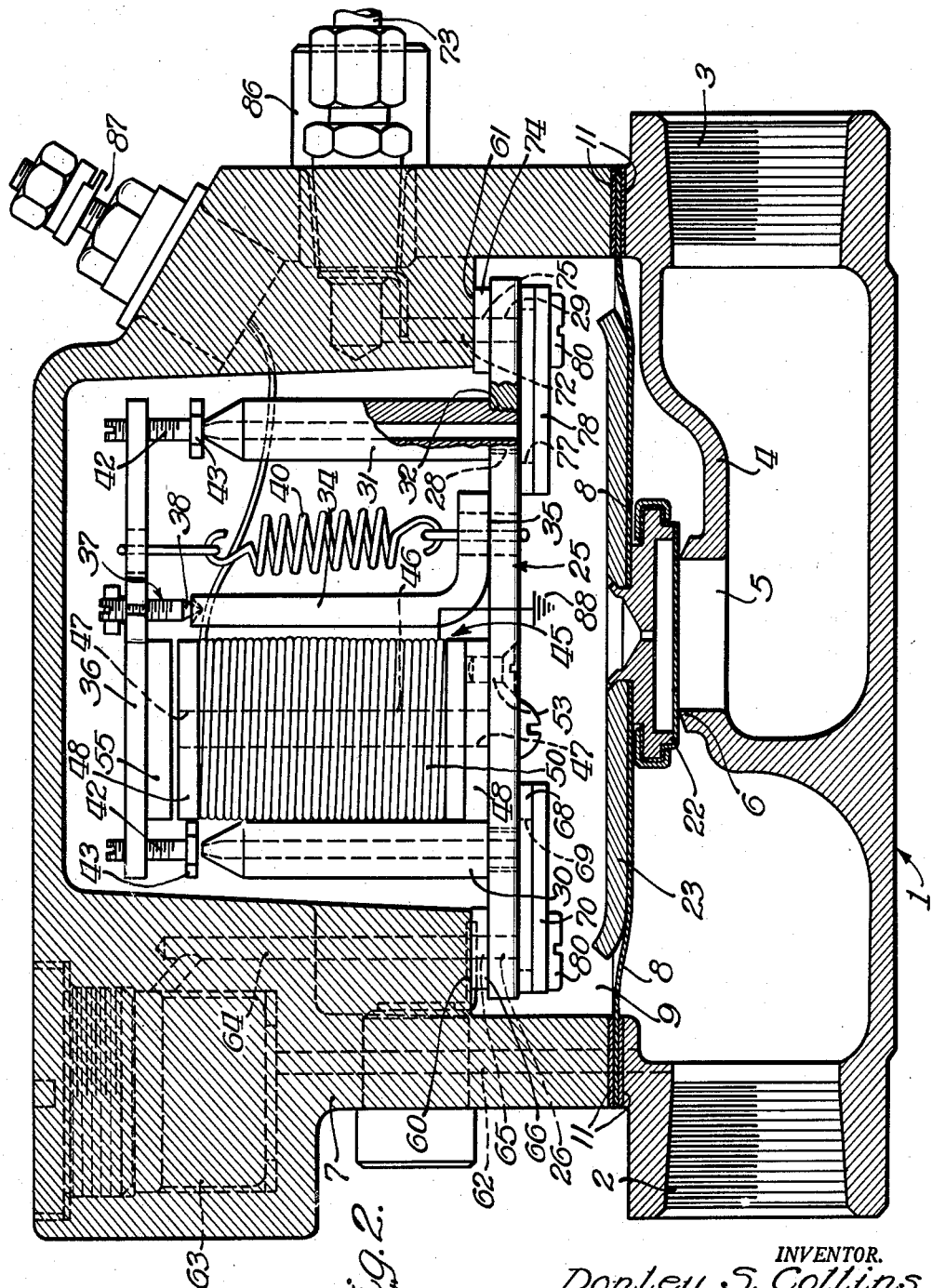

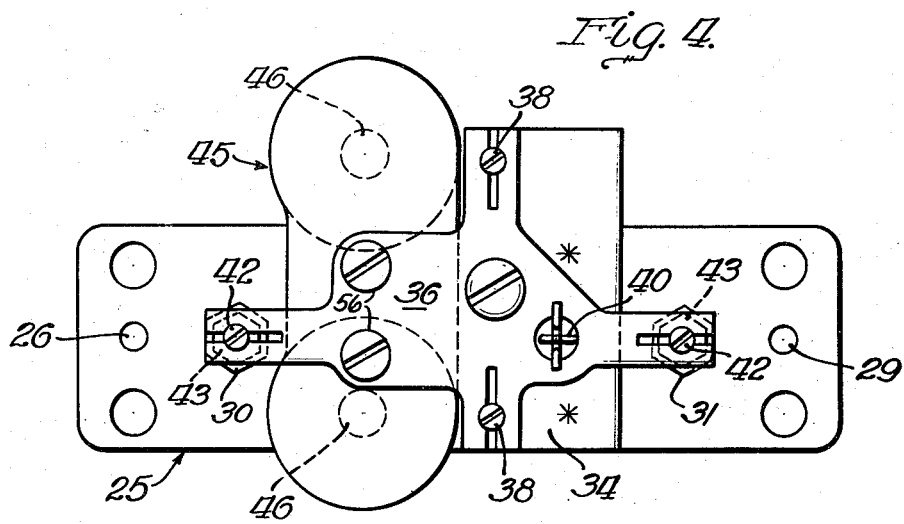
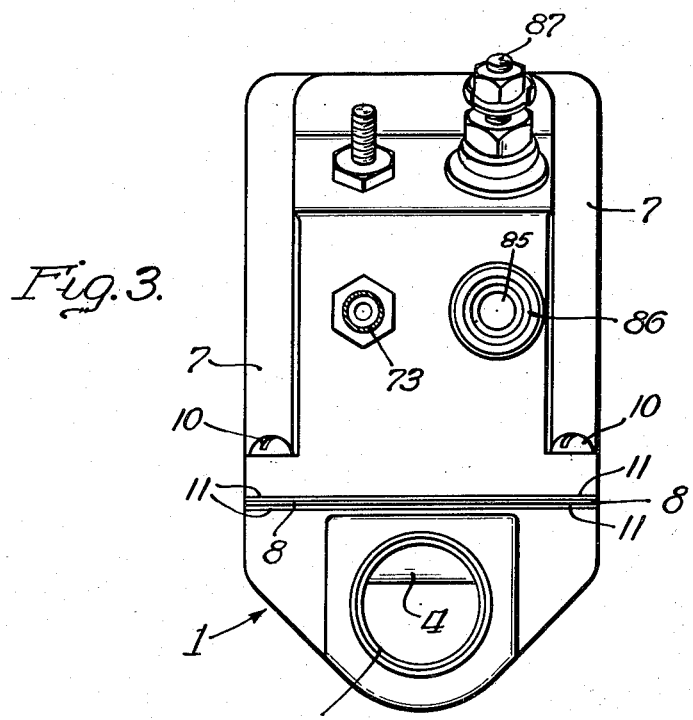

United States Patent Office 2,935,087
Patented May 3, 1960

2,935,087

THERMOELECTRICALLY POWERED AUTOMATIC DIAPHRAGM VALVE

Donley S. Collins, Shorewood, Wis., assignor to Baso Inc., a corporation of Wisconsin Continuation of application Serial No. 245,232, September 5, 1951. This application October 20, 1954, Serial No. 463,395

17 Claims. (Cl. 137—612.1)

This invention relates, in general, to fluid control valves, and has particular relation to a thermoelectrically powered automatic diaphragm valve which, under the control of fluid pressure and thermoelectric power, controls the flow of gaseous fuel to a burner. The present application is a continuation of my application Serial No. 245,232, filed September 5, 1951 and now abandoned.

It has previously been proposed in devices of the type with which the present invention is concerned to use a pilot valve under control of a thermoelectrically powered electromagnetic operator for controlling the diaphragm valve by thermoelectric power, the pilot valve being operable in one position to impose pressure of the gaseous fuel on the diaphragm valve with accompanying closing of same, and in another position to vent the fuel from the diaphragm chamber with accompanying opening of the diaphragm valve by fuel pressure.

These prior devices have required a thermopile (i.e., a plurality of thermocouples joined in series) for operating the same. They have not been adapted for operation by the relatively minute thermoelectric power that can be produced by the heat of the flame of a gas-burning pilot burner on the single "hot" junction of a single thermocouple.

Moreover, in these prior art devices, it has been difficult, if not impossible, to provide accurate correlation of the various parts of the device with close air gaps, and precision and standardization of the air gaps and the various parts of the device relative to each other.

These difficulties have been due, at least in part, to the fact that the various parts—such, for example, as the bleed port members, the electromagnetic operator, and the armature—have been attached to and supported on different parts or different surfaces, with the result that any discrepancy in the relation of these parts or surfaces reduces the accuracy and standardization of the air gap and the accuracy and standardization of the relation of the various operative parts of the device.

In certain prior art devices, it has been necessary to install separately in the casing or housing parts of the valve the electromagnetic operator, the bleed port members, and the armature and other parts of the device. This makes it impossible accurately to correlate these parts before installing them in the casing or housing. If it is attempted accurately to correlate the parts after they are separately installed, that is difficult, if not impossible, to accomplish.

Other prior art devices require outside the housing of the valve a separate tubular member for supplying fuel to the inlet bleed port member, and soldering or otherwise making connection between this tubular member and a sleeve member after the electromagnetic operator, the bleed port members, and the armature are installed in the housing.

One of the main objects of the present invention is to provide an improved form of thermoelectrically powered automatic diaphragm valve which is adapted for operation by the relatively minute thermoelectric power that can be produced by the heat of a gas-burning pilot burner on the single "hot" junction of a single thermocouple.

Another object of the invention is to provide a new and improved subassembly comprising an electromagnetic operator, bleed port members, and an armature which will permit accurate correlation of its various parts with close air gaps and with precision and standardization of the same, and the various parts relative to each other, before installing them in the casing or housing, and which subassembly may thereafter be installed in the casing or housing with ease and convenience, and with the various parts in assembled and accurately precorrelated and adjusted relation.

Another object of the invention is to provide a device having a fuel supply connection for the inlet bleed port member and a fuel vent connection for the outlet bleed port member which are adapted to be completed by the attachment of the subassembly of the electromagnetic operator, bleed port members, and armature to the interior of the casing or housing of the device.

Another object of the invention is to provide a device which is more uniformly sensitive than prior art devices, and which is more compact and includes an improved relation of the various parts of the unitary subassembly.

The invention also comprises certain other features of construction, and the combination and arrangement of the several parts to be hereinafter fully described, illustrated in the drawings and specifically pointed out in the appended claims.

In describing the illustrated embodiment of the invention in detail, reference will be had to the accompanying drawings wherein like reference characters denote like or corresponding parts throughout the several views, and in which:

Figure 1 is a view showing diagrammatically one illustrative example of a system employing a valve according to the present invention;

Figure 2 is a sectional view of an automatic diaphragm valve embodying the present invention;

Figure 3 is an end view of the valve shown in Figure 2;

Figure 4 is a top plan view of the unitary subassembly or power unit;

Figure 5 is a top plan view of the main base plate of the subassembly;

Figure 6 is a top plan view of one of the gaskets of the subassembly;

Figure 7 is a top plan view of one of the closure plates for the port in the gasket shown in Figure 6; and Figure 8 is a top plan view of another one of the gaskets of the subassembly.

Referring now to the drawings, the embodiment of the invention selected for illustration comprises a first valve body part 1 having a gaseous fuel inlet 2 and a gaseous fuel outlet 3. A partition 4 separates the inlet 2 from the outlet 3 and has a port 5 provided with a main annular valve seat 6.

A second valve body part or housing 7 covers an opening in the upper wall of the valve body part 1. A movable partition or flexible diaphragm 8 separates the chamber 9 within the housing 7 from the chamber beneath the diaphragm. The housing 7 is attached to the valve body part 1 by screws 10 with the diaphragm 8 clamped marginally therebetween, preferably with intervening gaskets 11 formed of material which is resistant to gaseous hydrocarbons.

As shown more or less diagrammatically in Figure 1, contiguous sections of a gaseous fuel supply pipe 12 are connected to the inlet 2 and outlet 3 of the valve body. The section connected to the outlet 3 leads to a main burner 13 located, for example, in the fire box of a furnace or other heater shown fragmentarily at 14. A pilot burner 15 is located in juxtaposition to the main burner 13 to maintain a pilot flame for igniting the main burner. The pilot burner 15 is supplied with gaseous fuel by a pilot fuel supply pipe 16. The place and manner in which the pilot fuel supply pipe 16 is connected to receive fuel supplied by the pipe 12 has not been shown, since it forms no part of the present invention and may vary widely. The positions of the pilot burner flames are shown in dotted lines for purposes of illustration.

The delivery of gaseous fuel from the pipe 12 to the burner 13 is preferably by way of a mixing chamber 17 to which air is admitted through adjustable air inlets (not shown), as well understood in the art.

Thermoelectrically connected in series with the coil of the electromagnetic operator, as will hereinafter appear in more detail, as by lead conductors 18, is a thermostat 19 and a single thermocouple 20 having a single "hot" junction disposed in the pilot burner flame or where it will be heated by the flame of the pilot burner 15 as long as the pilot burner is ignited.

Cooperable with the valve seat 6, as shown in Figure 2, is a valve member 22 secured to move with the flexible diaphragm 8. The surface of the valve member 22 which engages the valve seat 6 is preferably relatively soft as compared with the valve seat 6 to permit adaptation to the valve seat, and thus self-correction, to provide a tight seal when the valve is closed.

The plate 23 on the opposite side of the diaphragm 8 functions both as a stiffening member and as a weight biasing member for moving the valve member 22 to closed position against the seat 6 when the pressure in the chamber 9 is equal to the inlet pressure of the gaseous fuel beneath the diaphragm 8.

Mounted in the chamber 9 is pilot valve means under the control of a thermoelectrically powered electromagnetic operator for controlling the diaphragm valve. This pilot valve means and electromagnetic operator comprise a main base plate 25 having a first pair of openings or ports 26 and 27 and a second pair of openings or ports 28 and 29 opening therethrough as shown in Figure 5. A pair of tubular bleed port members 30 and 31 have coplanar attachment to one side of the base plate 25 and project from the base plate with their axes in laterally offset parallel relation and with the tips of the bleed port members in laterally offset relation. The attachment of the bleed port members 30 and 31 to the base plate 25 may be accomplished by screwing their lower externally threaded ends 32 into the ports or openings 27 and 28 respectively. Shoulders at the upper ends of the threaded ends 32 may be precision formed to seat against a precision finished upper surface of the plate 25 to assure proper correlation of the bleed port members 30 and 31 relative to each other and relative to the plate. 25.

A pivot bracket 34 of generally L-shaped form has its base attached at 35 to the plate 25 substantially coplanar with the attachment of the bleed port members 30 and 31. By precision surfacing the base of the bracket 34, its desired correlation with respect to the plate 25 and the bleed port members 30 and 31 is assured. The base of the bracket 34 may be secured to the plate 25 by screws, or by welding, or otherwise as desired.

An armature arm 36 is pivoted at 37 on the upper end of the bracket 34 for pivotal movement, for example, from position closing the upper end of the bleed port member 30 and opening the other bleed port member 31 to position opening the upper end of the bleed port member 30 and closing the upper end of the bleed port member 31, and vice versa. The pivot 37 is preferably provided by a screw 38, carried for adjustment by the armature arm 36, and has a pointed end seating in a conical pivot seat in the upper end of the bracket 34. A contractile spring 40 is connected at one end to the armature arm 36, and at its other end to the base plate 25. This spring 40 yieldingly urges or biases the armature arm 36 to retracted position, closing the bleed port member 31 and opening the bleed port member 30 as shown in Figure 2.

The armature arm 36 preferably carries, for adjustment therein, screws 42, and these screws carry pilot valve members 43. The pilot valve members 43 are preferably formed of steel or other relatively hard material and the bleed port members 30 and 31, or at least their upper ends which cooperate with the seat members 43, are preferably formed of aluminum or other relatively softer material. This permits coining or adaptation of the upper ends of the bleed port members 30 and 31 to the pilot valve members 43 in the operation of the device, thus providing self-correction and tight seals.

The thermoelectrically powered electromagnet operator, designated in general at 45 has a core comprising a pair of small diameter posts 46 the ends of which are expanded in openings 47 in pole pieces 48, and thereafter heat-treated, which causes a deformation and joining of the grains of metal so that the posts 46 and pole pieces 48 are practically in one piece. Where the material used for the core of the operator will permit, the posts 46 and pole pieces 48 may be formed in one piece. The coil 50 is wound around the posts 46 and between the pole pieces 48 and comprises, as an illustrative example, approximately 200 turns of No. 17 gauge copper wire having a resistance substantially equal to the resistance of the thermocouple 20 employed for powering the device.

For purposes of exemplification, a relay or eelctromagnetic valve operator of the type described is adapted, when energized by a single thermocouple heated by a gas-burning pilot burner under fire box conditions, to actuate the armature 36 to attracted position, thereby closing the upper end of the bleed port member 30 and opening the upper end of the bleed port member 31. Due to the limitation of this thermoelectric energy to a relatively minute amount and the inability to electromagnetically operate the device with such energy, it has heretofore been the practice to employ a thermopile comprising a number of thermocouples joined in series, or other means for accomplishing the desired results.

The base of the core of the operator or power unit 45 is attached to the main supporting base 25 coplanar with the attachment of the bleed port members 30 and 31 and bracket 34 to the base. This assures proper correlation of the operator relative to the base 25; also relative to the pivot bracket 34, and relative to the bleed port members 30 and 31. The attachment is obtained by attaching the bottom piece 48 to the base plate 25 by screws, one of which is shown at 53 in Figure 2.

While one pivot screw 38 is referred to in the preceding description, it will be noted that there may be two such screws as indicated in Figure 4. The relay or magnetic operator is provided with an armature 55 at least equal in area to the pole faces of the upper pole pieces 48, and the magnetic flux path is adapted to be completed through this armature. The armature 55 is attached to the under side of the armature arm 36, for example, by screws 56 as shown in Figure 4.

Internally the housing 7 has a pair of seats 60 and 61 against which is adapted to be attached in supported position the power unit which is adapted to be installed as a unitary subassembly with the parts thereof in assembled and correlated relation.

Gas is delivered from the inlet side 2 of the valve through a passage 62 in the wall of the housing 7 and through a filter 63, and another passage 64 in the wall of the housing and hole or port 65 in a gasket between the plate 25 and the seat 60 into the port 26 in the base plate 25. On the opposite side of the base plate 25 is another gasket 68 having, as shown in Figure 6, a port 69 which places the port 26 in communication with the hollow interior of the bleed port member 30. A plate 70 closes the bottom of the port 69.

The wall structure of the housing 7 also has a vent passage 72 opening from the chamber 9 through the seat 61 and out through a pipe 73 which may vent the gas from the chamber 9 to position adjacent to the flame of the pilot burner 15 as shown in Figure 1. A gasket 74 is interposed between the seat 61 and the base plate 25, and has a port 75 placing the adjacent end of the passage 72 in communication with the port 29 in the base plate 25. On the opposite side of the base plate 25 is another gasket 76 having, similar to the gasket 68, a port or opening 77 which places the vent passage 72 in communication with the bleed port member 31. A plate 78 closes the bottom of the port 77.

Screws 80, which extend through openings in the gaskets 66, 68, 74, and 76; also through openings in the base plate 25, and through openings in the plates 70 and 78 and are screwed into threaded openings in the internal wall structure of the housing 7, attach the power unit as a unitary subassembly to the internal wall structure of the housing 7. From the foregoing description it will be apparent that the attachment of the unitary subassembly in supported position within the housing 7 connects the bleed port members 30 and 31 to the gaseous fuel inlet passage 64 and the gaseous fuel outlet or vent passage 72.

The inner coaxial conductor of the coaxial lead 18 is connected to an inner insulated terminal 85 of the terminal assembly 86. The outer coaxial conductor of the coaxial lead 18 is grounded as in conventional practice. The terminal 85 connects with the internal wiring (not shown) and is the live side of the thermoelectric circuit. The opposite end of the winding or coil 50, which is connected to terminal 85 through the thermostat 19, is grounded at 88, for example, to the cover of the device. Since the terminal and binding post assemblies and the circuit connections constitute no part of the present invention, it is believed that the more or less diagrammatic illustration and general description will suffice for purposes of the present application.

The operation of the device is, in general, as follows: Whenever the temperature at the thermostat 19 rises sufficiently, the thermostat opens the thermoelectric circuit, thus deenergizing the coil 50 of the electromagnetic operator, and the spring 40 actuates the armature arm 36 to the position shown in Figure 2, closing the vent bleed port member 31 and opening the bleed port member 30. Gaseous fuel then enters the chamber 9 from the inlet side 2 of the valve through the bleed port member 30, and the weight of the plate 23 moves the valve 22 to closed position against the valve seat 6, thus shutting off the flow of gaseous fuel to the main burner 13.

When the temperature at the thermostat 19 drops sufficiently, the thermostat closes the thermoelectric circuit, and, with the flame of the pilot burner 15 heating the "hot" junction of the thermocouple 20, the electromagnetic operator is thermoelectrically powered sufficiently to move the armature 55 to attracted position and the armature arm 36 to position closing the bleed port member 30 and opening the bleed port member 31. Gaseous fuel is now shut off from the inlet side of the valve to the chamber 9, and the gaseous fuel in the chamber 9 is discharged or vented through the vent pipe 73. As a result, the pressure of the gaseous fuel on the bottom of the diaphragm 8 now moves the valve member 22 to open position for delivery of fuel to the main burner where it is ignited by the pilot burner 15.

If at any time the flame of the pilot burner 15, which normally should burn constantly, becomes extinguished, thereby creating an unsafe condition, the thermocouple 20 will be deenergized and the flow of energizing thermoelectric current in the coil 50 will be discontinued. When this occurs, the spring 40 will instantly close the bleed port member 31 and open the bleed port member 30 with accompanying operation of the valve member 22 to closed position.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. In a thermoelectrically controlled fluid pressure operated valve, a subassembly comprising a main supporting base, a pair of tubular bleed port members having coplanar attachment to said base and projecting from said base with their axes in laterally offset parallel relation and with the tips of said bleed port members in laterally offset relation, a pivot bracket having attachment to said base substantially coplanar with the attachment of said bleed port members to the base, an armature arm having means biasing it to one position and pivoted between said bleed port members on said bracket for pivotal movement from position closing one of the bleed port members and opening the other bleed port member to position opening said one bleed port member and closing said other bleed port member, and a thermoelectrically powered electromagnetic operator for operating said armature arm against said biasing means and having attachment to said main supporting base substantially coplanar with the attachment of said bleed port members and pivot bracket to said base, a valve body, said base projecting at opposite ends beyond said bleed port members and being attached to said valve body at said projecting ends, one projecting end having a port communicating with the interior of one bleed port member and the other projecting end having a port communicating with the other bleed port member, said valve body being formed with port means for registration with the ports in said base by attachment of said base end portions to said valve body.

2. A thermoelectrically controlled fluid pressure operated valve subassembly according to claim 1 wherein the electromagnetic operator comprises a core having a pair of posts with pole pieces substantially in one piece with the ends of said posts.

3. A thermoelectrically controlled fluid pressure operated valve subassembly according to claim 1 wherein the bleed port members are positioned on one side of said base and the interiors of said bleed port members and the ports in the projecting ends of the base open through said base, and wherein there is means including ported gaskets secured to the opposite side of said base and placing the port in one projecting end of said base in communication with the interior of one bleed port member and the port in the other projecting end of said base in communication with the interior of the other bleed port member.

4. A thermoelectrically controlled fluid pressure operated valve subassembly according to claim 1 wherein there are screws having screw engagement with said armature arm and carrying pilot valve members for seating against the outer ends of said bleed port members.

5. A thermoelectrically controlled fluid pressure operated valve subassembly according to claim 1 wherein the electromagnetic operator and the pivot bracket are both attached to said base between said bleed port members.

6. In a thermoelectrically controlled fluid pressure operated valve of the type having a body provided with an internal chamber, seating surfaces one near each of the opposite ends of said chamber with a first port opening through one seating surface into said chamber for delivering fuel thereto and a second port opening through the other seating surface from said chamber for delivering fluid therefrom, a subassembly comprising a main supporting base, a pair of tubular bleed port members having coplanar attachment to said base and projecting from said base with their axes in laterally offset parallel relation and with the tips of said bleed port members in laterally offset relation, a pivot bracket having attachment to said base substantially coplanar with the attachment of said bleed port members to said base, an armature arm having means biasing it to one position and pivoted between said bleed port members on said bracket for pivotal movement from position closing one of said bleed port members and opening the other bleed port member to position opening said one bleed port member and closing said other bleed port member, and a thermoelectrically powered electromagnetic operator for operating said armature arm against said biasing means and having attachment to said main supporting base substantially coplanar with the attachment of said bleed port members and pivot bracket to said base, said base projecting at opposite ends beyond said bleed port members for attachment to said seating surfaces with said subassembly within said chamber, one projecting end of said base having a port placing the port opening through one seating surface in communication with the interior of one bleed port member and the other projecting end of said base having a port placing the port opening through the other seating surface in communication with the interior of the other bleed port member.

7. A thermoelectrically controlled fluid pressure operated valve according to claim 6 wherein the bleed port members are positioned on one side of said base and the interiors of said bleed port members and the ports in the projecting ends of the base open through said base, and wherein there is means including ported gaskets secured to the opposite side of said base and placing the port in one projecting end of said base in communication with the interior of one bleed port member and the port in the other projecting end of said base in communication with the interior of the other bleed port member.

8. In a fluid pressure operated valve having a fluid pressure operated valve member, electromagnetic means powered by a source of small electric energy, pilot valve means under the control of said electromagnetic means, a support against one and the same surface of which cooperating surfaces of said pilot valve means and said electromagnetic means are directly attached, said support surface and the cooperating surfaces of said pilot valve means and electromagnetic means being accurately finished, whereby said pilot valve means, said electromagnetic means and said support constitute a unitary assembly in which accurate relationship between said pilot valve means and said electromagnetic means is assured by said accurately finished surfaces, pilot valve control means on an armature arm having means biasing it to retracted position and movable to attracted position by energization of said electromagnetic means, a pivot bracket for said armature arm also having a cooperating surface attached to said surface of said support whereby said pivot bracket is also accurately related to both said pilot valve means and said electromagnetic means, and a housing for said unitary pilot valve means, electromagnetic means and support assembly, said housing having at least one surface to which said assembly is attached as a unit by attachment of said support to said at least one surface of said housing, said pilot valve means including port members between which the pivot for said armature arm is located, said housing having a wall with ports therein, and said support having ports placing said pilot valve port members in communication with the ports in the wall of said housing by attachment of said support thereto.

9. In a fluid pressure operated valve having a fluid pressure operated valve member, the combination of a unitary electromagnetically operated pilot valve assembly comprising a support, spaced port means on said support, pilot valve means on said support controlling the fluid flow through said port means, an electromagnetic operator on said support controlling said pilot valve means; and a housing for said unitary electromagnetically operated pilot valve assembly, said housing having at least one surface to which said unitary assembly is attached by attachment of said support to said at least one surface of said housing, said housing having ports therein, and said support having passage means placing said port means in communication with said housing ports by attachment of said support to said housing.

10. In a fluid pressure operated valve having a fluid pressure operated valve member, the combination of a unitary electromagnetically operated pilot valve assembly comprising a support, a pair of spaced port means on said support, pilot valve means on said support controlling the fluid flow through said port means and comprising a pivotally mounted actuating arm having means biasing it toward a position closing one of the port means and opening the other port means and movable to a position opening said one port means and closing said other port means, an electromagnetic operator on said support for operating said actuating arm against said biasing means; and a housing for said unitary electromagnetically operated pilot valve assembly, said housing having at least one surface to which said unitary assembly is attached by attachment of said support to said at least one surface of said housing, said housing having ports therein, and said support having passage means placing said port means in communication with said housing ports by attachment of said support to said housing.

11. In a fluid pressure operated valve having a fluid pressure operated valve member, the combination of a unitary electromagnetically operated pilot valve assembly comprising a support, spaced port means on said support, pilot valve means on said support controlling the fluid flow through said port means, an electromagnetic operator on said support controlling said pilot valve means; and a housing for said unitary electromagnetically operated pilot valve assembly, said support having projecting portions for attachment to said housing, said housing having a pair of surfaces to which said unitary assembly is attached by attachment of said support to said surfaces of said housing, said housing having ports therein communicating with said attaching surfaces, one projecting portion of said support having passage means placing one of said port means in communication with one of said housing ports by attachment of said support to said housing, and the other projecting portion of said support having passage means placing the other of said port means in communication with another of said housing ports by attachment of said support to said housing.

12. In a fluid pressure operated valve having a fluid pressure operated valve member, the combination of a unitary electromagnetically operated pilot valve assembly comprising a support, spaced port means on said support, pilot valve means on said support controlling the fluid flow through said port means and comprising a pivotally mounted actuating arm having means biasing it toward a position closing one of the port means and opening the other port means and movable to a position opening said one port means and closing said other port means, an electromagnetic operator on said support for operating said actuating arm against said biasing means; and a housing for said unitary electromagnetically operated pilot valve assembly, said support having projecting portions for attachment to said housing, said housing having a pair of surfaces to which said unitary assembly is attached by attachment of said support to said surfaces, said housing having ports therein communicating with said attaching surfaces, one projecting portion of said support having passage means placing one of said port means in communication with one of said housing ports by attachment of said support to said housing, and the other projecting portion of said support having passage means placing the other of said port means in communication with another of said housing ports by attachment of said support to said housing.

13. In a valve structure: a support having a pair of spaced ports; a member having jet openings corresponding to the ports and detachably secured to the support;

said jet openings extending in spaced relationship; said jet openings having edges that are defined by plane surfaces and a tiltable structure mounted on the member and at a point intermediate the jet openings, and having valve closure means with plane surfaces cooperating with said edges for alternately exposing one jet opening and closing the other opening in accordance with the angular position of the tiltable structure.

14. In a valve structure: a support having a pair of spaced ports; a member having jet openings corresponding to the ports and detachably secured to the support; said jet openings extending in spaced relationship; said jet openings having edges that are defined by plane surfaces; an electromagnet supported on said member, and having a core with a polar area facing in the same direction as the jet openings; armature means tiltably supported with respect to said polar area and at a point intermediate the jet openings and valve closure means carried by the armature means and having plane surfaces cooperating with said edges for alternately exposing one jet opening and closing the other opening in accordance with the angular position of the tiltable armature.

15. In a valve structure: a support having a pair of spaced ports; a member having jet openings corresponding to the ports and detachably secured to the support; said jet openings extending in spaced relationship; said jet openings having edges that are defined by sealing surfaces and a tiltable structure mounted on the member and at a point intermediate the jet openings, and having valve closure means with sealing surfaces cooperating with said edges for alternately exposing one jet opening and closing the other opening in accordance with the angular position of the tiltable structure.

16. In a valve structure: a support having a pair of spaced ports; a member having jet openings corresponding to the ports and detachably secured to the support; said jet openings extending in spaced relationship; said jet openings having edges that are defined by sealing surfaces; an electromagnet supported on said member, and having a core with a polar area facing in the same direction as the jet openings; an armature tiltably supported with respect to said polar area and at a point intermediate the jet openings; and valve closure means carried by the armature and having sealing surfaces cooperating with said edges for alternately exposing one jet opening and closing the other opening in accordance with the angular position of the tiltable armature.

17. In a valve structure, a support having a pair of spaced ports, a member detachably secured to said support and having a pair of spaced openings corresponding to the ports of said support, said openings having edges defined by sealing surfaces, valve closure means having sealing surfaces cooperating with said edges, and means on said member affording a movable mounting for said valve closure means permitting movement thereof between two operating positions alternately exposing one of said openings and closing the other in accordance with the operating position of said valve closure means.

References Cited in the file of this patent

UNITED STATES PATENTS

| | | |
|---|---|---|
| 74,597 | Rodier | Feb. 18, 1868 |
| 560,703 | Fortier | May 26, 1896 |
| 594,346 | Fortier | Nov. 23, 1897 |
| 2,084,294 | Cooper | June 15, 1937 |
| 2,261,562 | Ray | Nov. 4, 1941 |
| 2,292,477 | Ray | Aug. 11, 1942 |
| 2,294,693 | Ray | Sept. 1, 1942 |
| 2,328,986 | McKee | Sept. 7, 1943 |
| 2,336,887 | Piron | Dec. 14, 1943 |
| 2,454,946 | Rosenberger | Nov. 30, 1948 |
| 2,613,627 | Keto | Oct. 14, 1952 |
| 2,622,886 | McKee | Dec. 23, 1952 |
| 2,635,138 | Reisner | Apr. 14, 1953 |
| 2,696,083 | Eddy | Dec. 7, 1954 |
| 2,774,564 | Biggle | Dec. 18, 1956 |

FOREIGN PATENTS

| | | |
|---|---|---|
| 2,740 | Great Britain | of 1909 |

UNITED STATES PATENT OFFICE
CERTIFICATE OF CORRECTION

Patent No. 2,935,087                                  May 3, 1960

Donley S. Collins

It is hereby certified that error appears in the printed specification of the above numbered patent requiring correction and that the said Letters Patent should read as corrected below.

Column 4, line 48, after "bottom" insert -- pole --; line 67, after "gasket" insert -- 66 --; column 7, line 50, strike out "a" and insert instead -- an accurately finished --; column 9, lines 2 and 3, after "surfaces" insert a semicolon; line 18, after "openings" insert a semicolon; same column 9, lines 27 and 28, after "surfaces" insert a semicolon.

Signed and sealed this 8th day of November 1960.

(SEAL)

Attest:

KARL H. AXLINE                                                             ROBERT C. WATSON

Attesting Officer                                                       Commissioner of Patents